United States Patent [19]
Schulz

[11] 3,928,535
[45] Dec. 23, 1975

[54] SULFUR RECOVERY SYSTEM

[75] Inventor: Paul G. Schulz, Maumee, Ohio

[73] Assignee: Sun Oil Company of Pennsylvania, Philadelphia, Pa.

[22] Filed: Mar. 18, 1974

[21] Appl. No.: 452,493

Related U.S. Application Data

[63] Continuation-in-part of Ser. No. 352,758, April 19, 1973, abandoned, and a continuation-in-part of Ser. No. 438,054, Jan. 30, 1974, abandoned.

[52] U.S. Cl. ............... 423/224; 423/226; 423/514; 423/545; 423/551; 423/573; 23/300; 23/302; 23/302 A
[51] Int. Cl.² .......................................... B01D 53/34
[58] Field of Search ........... 423/221, 223, 224, 225, 423/226, 232, 233, 571, 514, 551, 573 L, 573, 545; 23/296, 300, 302, 302 A

[56] References Cited
UNITED STATES PATENTS

| | | |
|---|---|---|
| 2,386,985 | 10/1945 | Shaw ....................................... 23/296 |
| 2,997,439 | 8/1961 | Nicklin et al. ................... 423/573 X |
| 3,331,661 | 7/1967 | Boiston et al. ....................... 423/551 |
| 3,642,448 | 2/1972 | Beavon ................................ 423/573 |

FOREIGN PATENTS OR APPLICATIONS 737,295  9/1955  United Kingdom.................. 423/514

Primary Examiner—Earl C. Thomas
Attorney, Agent, or Firm—George L. Church; Donald R. Johnson; Paul Lipsitz

[57] ABSTRACT

In the operation of a process for removal of hydrogen sulfide from a gas or liquid stream by passing said gas through an aqueous solution containing dissolved recyclable oxidation-reduction components such as the sulfonic acid of an anthraquinone (e.g., the Stretford Process), the improvement of reducing the concentration of dissolved alkali metal and ammonium salts by adding methanol to said salt containing solution and separating precipitated salt from the solution.

15 Claims, 1 Drawing Figure

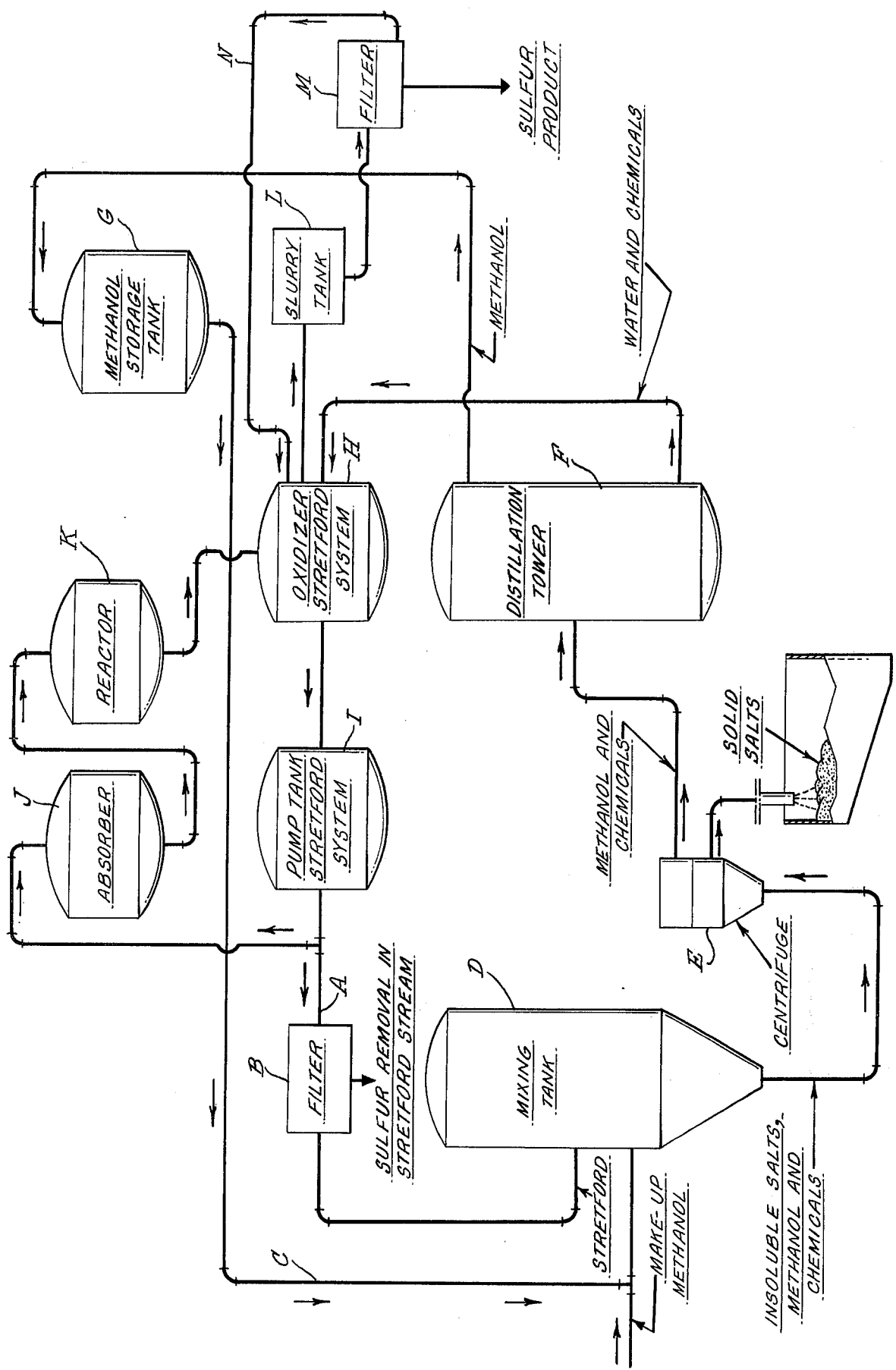

SULFUR RECOVERY SYSTEM

This application is a continuaton-in-part of application Ser. No. 352,758, filed Apr. 19, 1973, now abandoned, and of application Ser. No. 438,054, filed Jan. 30, 1974, now abandoned.

This invention relates to aqueous systems for removal of $H_2S$ from liquid or gaseous streams and where such system employs soluble recyclable oxidation-reduction components, particularly quinone type dye intermediates. Such a system is exemplified by the Stretfore system which employs anthraquinone disulfonic acids as described below. Another system is the Takahax process which used napthaquinone and alkali metal sulfonate as the oxidation-reduction system. The oxidation-reduction potentials of quinones is well known and, as indicated, such materials have been used in various sulfur removal systems. Reference is made to U.S. Pat. No. 3,459,495 and to the patents listed below which descirbe in detail the use of numerous quinones in sulfur removal processes.

The Stretford Process for the removal of hydrogen sulfide from gaseous and liquid streams is also a well known commercial process and is described in the article by Nicklin and Brunner, *Hydrocarbon Processing and Petroleum Refiner*, December 1961, vol. 40, no. 12, pgs. 141–146 and in the disclosure of U.S. Pat. Nos. 2,997,439 and 3,035,889, both in the name of Nicklin et al. and assigned to North Western Gas Board and the Clayton Aniline Company, Ltd., Manchester, England. The original process employs an aqueous alkaline solution of sodium salts of anthraquinone disulfonic acids and involves the following steps:

1. Absorption of hydrogen sulfide in the alkaline solution.
2. Reduction of the anthraquinone disulfonic acic (ADA) by means of absorbed hydrosulfide.
3. Liberation of solid sulfur from the reduced anthraquinone disulfonic acid by interaction with oxygen dissolved in the solution. The solid sulfur is physically removed from the system.
4. Re-oxidation of the reduced anthraquinone disulfonic acid, usually by air blowing.
5. Re-oxygenation of the alkaline solution providing dissolved oxygen in the solution for above stage (3) of the process.

In an improved Stretford process an alkali metal polyvalent metal salt (preferably an alkali metal vanadate) is incorporated in the system as a catalyst to increase the speed of reaction between hydrosulfide and the anthraquinone disulfonic acid to produce sulfur. In this improved process there is a conversion of $V^{+5}$ to $V^{+4}$ during the oxidation of hydrosulfide to sulfur and although blowing with air will oxidize $V^{+4}$ to the $V^{+5}$ needed for the catalytic action, the anthraquinone disulfonic acid present does effect the oxidation of $V^{+4}$ back to vanadate, and the reduced ADA is in turn regenerated by the air blowing. Thus, this improved technique does not depend upon dissolved oxygen, but is a complete oxidation-reducton cycle.

The process is generally operated in the pH range of 8.0 to 9.5, and for many applications a more restricted range of 8.8 to 9.1 is preferred, but where thiosulfate formation is high (e.g. about 6 percent to 8 percent total sulfur converted to thiosulfate), the preferred pH range is from about 8.0 to about 8.5. The required pH is obtained by using alkaline materials such as caustic soda, caustic potash, ammonia, ammonium or alkali metal carbonates, and organic bases such as alkanolamines. Preferably, ammonia, carbonates or alkali metal hydroxides are used and sodium hydroxide is a most preferred agent although a mixture of ammonia and sodium hydroxide is also quite useful.

The commerical mixture of anthraquinone disulfonic acids normally employed as sodium salts consists of almost equal amounts of the 2:6 - and 2.7- isomers. It is possible to use other anthraquinone disulfonic acid isomers, notably a mixture of anthraquinone 1:5 and 1:8 disulfonic acids (sodium salts), but on economic considerations, speed of reduction and general convenience it is preferred to use the 2:6, 2:7 isomers.

In addition to the removal of hydrogen sulfide from coal gas, the process has also been applied to the purification of refinery gases, effluent air streams such as those encountered in the viscose industry, gases rich in carbon dioxide and also those gases used for the purification of crude benzoles and petroleum products containing hydrogen sulfide. Liquid phase systems are also amenable to the process as disclosed in U.S. Pat. No. 2,997,439 referred to above.

IN the commercial operation of the above described sulfur removal systems, particularly the improved vanadate containing Stretford Process, there is a problem with build-up of dissolved salts; e.g., sodium thiosulfate formed in side reactions. This build-up becomes so great that some of the Stretford solution must be replaced to prevent viscosity and salting out problems and the cost of such replacement is quite high. In addition to sodium thiosulfate, sodium sulfate is a frequent contaminant of the system and these sulfate salts may be in an amount equal to or even more than the amount of thiosulfate salts. sodium sulfate is believed to be formed to some degree from the sodium thiosulfate present and its removal from the system is also necessary. Also found in the system and which may be removed by the process of the invention are tartrates which are used as buffers, and if ammonia is used as a source of alkalinity the corresponding ammonium salts.

Attempts to solve the problem of this by-product salt build-up often leads to destruction of the oxidation-reduction system. For example, addition to the aqueous $H_2S$ removal system of numerous agents to precipitate the by-product salts also precipitates the oxididant-reductant and/or catalyst in the system. For example, when ethanol is added to Stretford solution which contains by-product thiosulfate and/or sulfate salts, two liquid layers are formed, both of which contain coloration, thus showing the extraction of some of the oxidant-reductant agents. Accordingly, the teaching disclosed in U.S. Pat. No. 2,386,985 that alcohol (95 percent ethanol) will precipitate and may be used to separate thiosulfate and thiocyanate salts from an aqueous gas liquor used in $H_2S$ removal (the Thylox process) is not applicable to the Stretford and similar systems discussed above. Thus the sensitivity of the oxidant-reductant or catalyst to the added material makes a precipitating technique an unlikely approach to solving the problem.

Now, however, a method to alleviate the problem of salt build-up in the above described systems by a suitable precipitating technique has been found. In accord with this invention, methanol is added to the by-product salt containing solution which effects precipitation of the dissolved alkali metal or ammonium salts without precipitating a significant amount of the oxidant-reductant or the catalyst used in the system.

The process of the invention is operable with any hydrogen sulfide removal procedure where the H₂S containing phase (i.e., gas or liquid) is contracted with an alkaline aqueous solution containing an oxidation-reduction component and where alkali metal or ammonium salt build-up is a problem. One technique used commerically is called the Stretford Process, described above, and the process of the invention will be used preferably with Stretford solution, which as indicated is a solution consisting essentially of water, salts of anthraquinone disulfonic acid (ADA), sodium vanadate or other polyvalent metal salts, a chelating agent to help keep the vanadium salt in solution and pH buffers such as tartrates, borates, etc. It will be understood that the components of the Stretford solution will vary, both initially during use, due to variations occuring in sulfide loading and the flow of gases through the system, but, in general, the approximate concentration of the various agents will be as follows (percent by weight): ADA 0.05 to 5 percent; sodium vanadate: 0.01 to 0.5 percent; buffer: 0.3 to 2 percent.

As indicated, methanol is employed as the effective agent other alcohols being incapable of giving any significant separation of salts. It has also been found by experiment that alkanols such as ethanol, n-propanol, isopropanol, the butanols and the like are unsatisfactory for the process of the invention because they extract the expensive oxidant-reductant and/or catalyst which are necessary components for the recycle streams used for the continuous removal of sulfur from the gases or liquids being treated by the system. Other agents such as ketones (acetone) also proved to be inoperative for the process. Preferably, the methanol used will be industrial grade methanol which is most econimical and quite satisfactory. It will also be understood that the used methanol may readily be recovered by distillation and the distilled product recycled for additional salt precipitation.

The amount of methanol added to the Stretford solution may vary, but the minimum amount should be at least an amount such that the volume ratio of methanol to the aqueous solution (e.g., the Stretford solution) is about 25:75. Very good results are obtained when the proportion of methanol to Stretford solution is about 30:70 preferably above 60:40 and most preferably 65:35. However, when the ratio of methanol to Stretford solution is on the order of 70:30 or higher, some sodium vanadate is precipitated and this is to be avoided. Thus, the most preferred ratio is about 30:70 to about 65:35. However, if it is desired to specifically remove ammonium thiosulfate the methanol to Stretford solution ratio should be on the order of 75:25. For removal of sodium sulfate, sodium thiosulfate and ammonium sulfate the 65:35 ratio is most preferred.

In order to further illustrate the process, reference is not made to the drawing which exemplifies the invention with the Stretford process. As can be seen, a slip stream of the Stretford solution (A) (preferably passed through a filter (B) to remove any solid sulfur particles) and methanol (C) are introduced to a mixing tank (D). The methanol and Stretford solution may be pre-mixed, of course before entering the tank. A stirrer or other mixing device may, of course, be used for optimum mixing kin the tank. Preferably, the solution in the tank is maintained at about 15° to about 19°C., as this enhances the rate of salt crystal formation and increases the size and hardness of the crystals thus making separation easier and more efficient. After a residence time during which crystal formation occurs and which may vary from several hours, (e.g., from about 45 minutes to about 3 hours, and preferably at least about 45 minutes), the aqueous medium containing suspended solids of thiosulfate and other salts is withdrawn from the tank to a filter or other separating device. Preferably, the suspension of precipitated crystals is fed directly to a centrifuge (E) to effect separation of the crystals from the aqueous medium. This aqueous medium also contains some methanol, anthraquinone disulfonic acid salt (ADS), sodium vanadate and other chemicals, and after the solid salts are separated the aqueous filtrate is taken to a distillation column (F). The aqueous methanol solution is distilled to recover methanol which may be stored in a tank (G) and recycled to the mixing tank (D). The undistilled residue from the distillation column contains the still useful ADS and sodium vanadate which is returned directly to the oxidizer unit (H) of the Stretford system stream and the regenerated solution fed to the pump tank (I) from which the major portion of the Stretford solution is taken to the absorber (J) for use in treating H₂S containing streams. The solution from the absorber than passes to the reactor (K) where the reaction of hydrosulfide to sulfur is completed. It will be understood that in accord with conventional practice for this system the absorber (J) and the reactor (K) may be combined in a single vessel. At any rate, the sulfur containing solution then proceeds to the oxidizer (H) where the solution is regenerated and the free sulfur is frothed to the surface. The sulfur froth from the oxidizer (H) is then taken to a slurry tank (L) before proceeding to a filter (M) or other separating device so that the sulfur product may be removed. The filtrate (N) from the sulfur separation is returned to the oxidizer (H) for recycle.

By the above-described procedure a significant proportion of the sodium thiosulfate and other salts is removed from the Stretford solution as solids and yet the expensive vanadate and anthraquinone compound is recovered leaving the Stretford solution ready for cotinued reuse. The removed salts have economic value in those markets where thiosulfate and/or sulfate salts are employed, or they can be used as intermediates to useful products.

In order to further illustrate the invention, the following examples are given:

GENERAL PROCEDURE

Various proportions of methanol and Stretford solution containing a known build-up of sodium thiosulfate are mixed at 20°C (except as noted in Table III) and allowed to stand for 2 hours. The sodium thiosulfate precipitate is filtered off and the filtrate is distilled to recover methanol. The liquid portion is than analyzed for thiosulfate, vanadium, and anthraquinone disulfonic acid. The values obtained on a methanol free basis are shown in the following tables:

TABLE I

Stretford Solution Containing 300 gm/l Sodium Thiosulfate Build-up Treated with Methanol

| Methanol (vol%) | Stretford Solution (vol%) | Thiosulfate In Liquid Phase After Treatment (gm/l) | Vanadium Content In Liquid Phase After Treatment (gm/l) | ADA Content In Liquid Phase After Treatment |
|---|---|---|---|---|
| 0 | 100 | 300 | 1.8 | 1.2 |
| 30 | 70 | 186 | 1.8 | 1.2 |
| 40 | 60 | 211 | 1.8 | 1.2 |
| 50 | 50 | 209 | 1.8 | 1.2 |
| 60 | 40 | 181 | 1.8 | 1.2 |
| 70 | 30 | 82 | 1.6 | 1.1 |
| 80 | 20 | 99 | 1.3 | 1.2 |

TABLE II

Stretford Solution Containing 500 gm/l Sodium Thiosulfate Build-up Treated with Methanol

| Methanol (vol%) | Stretford Solution (vol%) | Thiosulfate In Liquid Phase After Treatment (gm/l) | Vanadium Content In Liquid Phase After Treatment (gm/l) | ADA Content In Liquid Phase After Treatment |
|---|---|---|---|---|
| 0 | 100 | 500 | 1.8 | 1.2 |
| 60 | 40 | 190 | 1.8 | 1.2 |
| 70 | 30 | 63 | 1.4 | 1.1 |
| 80 | 20 | 99 | 1.2 | 1.1 |

As can be seen from the data of Tables I and II, the methanol treatment effectively reduces the thiosulfate content, but at a methanol to Stretford solution ratio of 70:30 and higher small amounts of vanadium are lost from the Stretford solution. It is also clear that the process of the invention does not deplete ADA from the Stretford solution.

Table III shows the effect of temperature on recovery of the precipitated salt. Methanol was added to three samples of thiosulfate containing Stretford solution and held for 2 hours at various temperatures as shown in the table.

TABLE III

Effect of Temperatures on Recovery of Thiosulfate from Stretford Solution Containing 500 gm/l Sodium Thiosulfate Using a Ratio of Methanol to Stretford Solution of 60:40 and Two Hour Settling Time

| Temp °C | Thiosulfate In Liquid Phase After Treatment gm/l |
|---|---|
| 0 | 56 |
| 25 | 180 |
| 65 | 352 |

It is clear from Table III that the lower temperatures are preferred in order to remove the maximim amount of thiosulfate.

In another experiment it is shown that no significant loss of vanadate or anthraquinone sulfonic acid is experienced by the process since these agents appear in the bottoms from the methanol distillation and may be recycled to the Stretford system as explained above. Table IV indicates the data:

TABLE IV

Stretford Solution Containing 300 gm/l Sodium Thiosulfate Treated with Methanol (Methanol: Stretford Solution = 60:40)

|  | $Na_2S_2O_3$ (gm/l) | ADA (gm/l) | Vanadium Ion (gm/l) |
|---|---|---|---|
| Solution Before Treatment | 300 | 1.0 | 1.9 |
| *Filtrate After Separation of $Na_2S_2O_3$ | 90 | — | 2.0 |
| Aqueous Bottoms After Methanol Distillation | 88 | 1.0 | 1.9 |

*Calculated on methanol free basis

It is clear from the above data that no significant loss of expensive vanadium and anthraquinone disulfonic acid is experienced by use of the process.

In still another experiment Stretford solution containing both sodium thiosulfate and sodium sulfate was treated with methanol, the temperature of the mixture being 15° to 19°C. The following Table V indicates the conditions and results obtained:

TABLE V

Stretford Solution Containing 153 gm/l of $Na_2SO_4$ and 94 gm/l of $Na_2S_2O_3$ Treated with Methanol (Methanol: Stretford Solution = 65:35)

| Residence Time (Min.) | Filtrate After Separation* | |
|---|---|---|
|  | $Na_2S_2O_3$ gm/l | $Na_2SO_4$ |
| 45 | 89.4 | 18.9 |
| 90 | 88.9 | 18.1 |
| 180 | 91.6 | 16.2 |

*Calculated on Methanol free basis

It is clear from the data of Table V that the reduction of sulfate from 88.6% and that even though initial thiosulfate in the Stretford solution is originally low, additional thiosulfate is still removed.

It will be understood that the process of this invention is applicable to the aqueous solutions used for removal of $H_2S$ whether used in vapor phase or liquid phase (e.g., the process of U.S. Pat. No. 2,997,439). Furthermore, the aqueous solution (e.g., Stretford solution) may use any of the various isomers of anthraquinone sulfonic acids. Additional variations and applications of the process of the invention will be obvious to the skilled art worker.

The invention claimed is:

1. A process for reducing the concentration of dissolved by-product alkali metal or ammonium thiosulfate or sulfate salts in aqueous $H_2S$ removal systems containing a dissolved quinone type oxidation-reduction component which is recycled in said system and which is sensitive to precipitants for said by-product salts, which comprises mixing methanol with a solution containing said by-product salts and said sensitive oxidation-reduction component in a volume ratio of methanol to said aqueous solution of from about 25:75 to about 65:35, thereby precipitating said by-product salts but not said oxidation-reduction component, and separating said precipitated salts from said solution.

2. A process for reducing the concentration of dissolved by-product alkali metal or ammonium thiosulfate or sulfate salts in aqueous $H_2S$ removal systems containing a dissolved anthraquinone or naphthoquinone type oxidation-reduction component which is recycled in said system and which is sensitive to precipitants for said by-product salts, which comprises mixing methanol with a solution containing said by-product salts and said sensitive oxidation-reduction component, in a volume ratio of methanol to said aqueous solution of from about 25:75 to about 65:35, thereby precipitating said by-product salts but not said oxidation-reduction component, and separating said precipitated salts from said solution.

3. The process of claim 2 where the oxidation-reduction component is an anthraquinone.

4. The process of claim 2 where the oxidation-reduction component is a naphthaquinone.

5. A process for reducing the concentration of by-product thiosulfate or sulfate salts in an aqueous solution containing an anthraquinone disulfonic acid and an alkali metal polyvalent metal salt which comprises mixing methanol with said salt containing solution in a volume ratio of methanol to said aqueous solution of from about 25:75 to about 65:35 and separating said precipitated salts.

6. The process of claim 5 where the alkali polyvalent metal salt is an alkali metal vanadate.

7. The process of claim 5 where the anthraquinone disulfonic acid is a mixture of the 2:6, and 2:7 isomers.

8. In the operation of a process for removal of hydrogen sulfide from a gas stream by passing said gas through an alkaline aqueous solution containing an alkali metal salt of an anthraquinone disulfonic acid and an alkali metal vanadate and where by-product thiosulfate is formed, the improvement of removing the build-up of thiosulfate by mixing methanol with said thiosulfate containing solution, in a volume ratio of methanol to said aqueous solution of from about 25:75 to about 65:35 and separating the precipitated salt from the solution.

9. The process of claim 8 where the ratio is 30:70 to 65:35.

10. The process of claim 9 where the anthraquinone disulfonic acids are a mixture of the 2:6, and 2:7 isomers.

11. In the operation of a process for removal of hydrogen sulfide from a gas stream by passing said gas through an aqueous alkaline solution containing the sodium salts of an anthraquinone disulfonic acid and sodium vanadate and where by-product alkali metal thiosulfate or sulfate salts are formed, the improvement which comprises reducing the build-up of said salts by mixing methanol with said salt containing solution in an amount such that the volume ratio of methanol to said salt solution is from about 25:75 to 65:35, maintaining the mixture of methanol and said salt solution at a temperature of between about 15° and about 19°C. for at least about 45 minutes, separating said salts from the aqueous phase, recovering methanol for reuse by distilling the aqueous phase from said separation, and recycling the distillation bottoms to said aqueous alkaline solution for use in further treatment of a gas stream.

12. The process of claim 11 where the by-product salt is thiosulfate.

13. The process of claim 11 where the by-product salt is sulfate.

14. The process of claim 11 where the anthraquinone disulfonic acid is a mixture of 2:6, and 2:7 isomers.

15. The process of claim 14 where the by-product salt is a mixture of thiosulfate and sulfate.

* * * * *